United States Patent
Abejide (10) Patent No.: US 12,428,790 B2
(45) Date of Patent: Sep. 30, 2025

(54) PORTABLE WARM ASPHALT PREPARATION APPARATUS AND PROCESS FOR THE PRODUCTION OF WARM ASPHALT

(71) Applicant: WALTER SISULU UNIVERSITY, Unitra (CA)

(72) Inventor: Samuel Abejide, Unitra (CA)

(73) Assignee: WALTER SISULU UNIVERSITY, Unitra (ZA)

( * ) Notice: Subject to any disclaimer, the term of this patent is extended or adjusted under 35 U.S.C. 154(b) by 0 days.

(21) Appl. No.: 18/564,168

(22) PCT Filed: Jun. 9, 2022

(86) PCT No.: PCT/IB2022/055375
§ 371 (c)(1),
(2) Date: Nov. 27, 2023

(87) PCT Pub. No.: WO2022/263978
PCT Pub. Date: Dec. 22, 2022

(65) Prior Publication Data
US 2024/0150976 A1   May 9, 2024

(30) Foreign Application Priority Data

Jun. 17, 2021 (ZA) ................................ 2021/04123
Jun. 17, 2021 (ZA) ................................ 2021/04124

(51) Int. Cl.
*E01C 19/08* (2006.01)
*B28C 5/14* (2006.01)
(Continued)

(52) U.S. Cl.
CPC .............. *E01C 19/08* (2013.01); *B28C 5/141* (2013.01); *B28C 5/466* (2013.01); *B28C 7/003* (2013.01);
(Continued)

(58) Field of Classification Search
CPC ........ E01C 19/08; E01C 19/10; E01C 19/104; Y02A 30/30; B28C 5/0875; B28C 5/141;
(Continued)

(56) References Cited

U.S. PATENT DOCUMENTS 2,703,704 A * 3/1955 Wylie ................... E01C 19/104
239/668
2,710,744 A * 6/1955 Hensler ............... E01C 19/1045
366/24
(Continued)

FOREIGN PATENT DOCUMENTS

DE      3333673 A1 *  4/1985
DE   20009621 U1 *  8/2000   .............. B01F 5/104
(Continued)

*Primary Examiner* — Charles Cooley
(74) *Attorney, Agent, or Firm* — SALIWANCHIK, LLOYD & EISENSCHENK (57) ABSTRACT

The subject invention provides a portable warm asphalt preparation apparatus and a process for the production of warm asphalt. In addition to a source of granular plastic and a source of mineral aggregate that, together form an asphalt feed material, the apparatus comprises a first receptacle having an inlet for introducing the asphalt feed material into a chamber, a floor at an inclined plane, and an outlet for discharging asphalt from the chamber. A source of heat supplies heat to the asphalt feed material. The apparatus also has a conveyer for mixing the asphalt feed material and transporting a resultant warm mixture towards the outlet. The apparatus further comprises a temperature sensor for measuring the temperature within the chamber, and a controller that activates or deactivates the heater based on input from the temperature sensor.

16 Claims, 11 Drawing Sheets

(51) Int. Cl.
*B28C 5/46* (2006.01)
*B28C 7/00* (2006.01)
*B28C 7/04* (2006.01)
*E01C 19/10* (2006.01)

(52) U.S. Cl.
CPC ............ *B28C 7/0477* (2013.01); *E01C 19/10* (2013.01); *E01C 19/104* (2013.01)

(58) Field of Classification Search
CPC ........... B28C 5/145; B28C 5/16; B28C 5/466; B28C 7/003; B28C 5/08; B28C 5/14; B28C 5/46; B28C 7/00; B28C 7/0023; B28C 7/0007; B01F 35/91; B01F 2035/91; B01F 2035/99
USPC ...................................... 366/22–25, 144–148
See application file for complete search history.

(56) References Cited

U.S. PATENT DOCUMENTS

| | | | | |
|---|---|---|---|---|
| 4,130,364 A | * | 12/1978 | Brown | E01C 19/1036 366/4 |
| 4,297,208 A | * | 10/1981 | Christian | B01D 21/04 210/523 |
| 4,483,625 A | * | 11/1984 | Fisher | B01F 27/62 366/196 |
| 4,695,186 A | * | 9/1987 | King | E01C 19/08 366/23 |
| 4,941,132 A | * | 7/1990 | Horn | B01F 27/726 366/300 |
| 4,946,283 A | | 8/1990 | Musil | |
| 5,120,217 A | * | 6/1992 | O'Brien | E01C 19/08 432/13 |
| 5,228,775 A | * | 7/1993 | Horn | B01F 27/72 366/300 |
| 5,342,124 A | * | 8/1994 | Swisher, Jr. | B01F 27/0726 366/173.2 |
| 5,579,587 A | * | 12/1996 | Morrison | E01C 19/1036 34/135 |
| 5,607,113 A | * | 3/1997 | McGuffin, Sr. | B02C 18/30 241/101.8 |
| 5,702,199 A | | 12/1997 | Fishback et al. | |
| 5,785,420 A | * | 7/1998 | Schuff | B28C 5/142 366/35 |
| 5,947,720 A | * | 9/1999 | Kelly | E01C 19/08 219/390 |
| 6,183,560 B1 | * | 2/2001 | Sarrasin | B01F 27/1921 118/19 |
| 6,595,677 B2 | * | 7/2003 | Anderson | B28C 5/12 366/276 |
| 6,656,242 B1 | * | 12/2003 | Golightly | E01C 19/104 55/467 |
| 7,654,772 B1 | | 2/2010 | Zimmerman | |
| 7,748,888 B2 | * | 7/2010 | Bold | F26B 11/0436 366/38 |
| 10,358,296 B2 | * | 7/2019 | Guymon | E01C 19/46 |
| 2002/0018397 A1 | * | 2/2002 | Anderson | B01F 31/445 366/276 |
| 2007/0268778 A1 | * | 11/2007 | Velsor | B28C 7/003 366/22 |
| 2009/0229491 A1 | * | 9/2009 | Harmon | E01C 19/104 241/101.8 |
| 2011/0265993 A1 | | 11/2011 | Williams et al. | |
| 2016/0199799 A1 | | 7/2016 | Huh | |
| 2024/0150976 A1 | * | 5/2024 | Abejide | E01C 19/10 |

FOREIGN PATENT DOCUMENTS

KR 101769030 B1 8/2017
WO WO-2010012597 A1 * 2/2010 ............. C08L 95/00

* cited by examiner

PORTABLE WARM ASPHALT PREPARATION APPARATUS AND PROCESS FOR THE PRODUCTION OF WARM ASPHALT

CROSS REFERENCE TO RELATED APPLICATIONS

This application is a National Stage Application of International Application Number PCT/IB2022/055375, filed Jun. 9, 2022; which claims priority to South Africa Patent Application No. 2021/04123, filed Jun. 17, 2021; and South Africa Patent Application No. 2021/04124, filed Jun. 17, 2021; all of which are incorporated herein.

INTRODUCTION AND BACKGROUND

This invention relates to a portable warm asphalt preparation apparatus and a process for the production of warm asphalt comprising a source of granular plastic.

There is a requirement in road maintenance to repair defects such as cracks, potholes and the like quickly and inexpensively. A delay in repairing small potholes for example would lead to an increased chance for water penetrating the layer of material that lies immediately below an asphalt surface, and thus, leading to severe surface structural failure.

Asphalt, also referred to as asphalt concrete, comprises a mixture of an asphaltic binder, such as bitumen as a dark brown to black cementitious material, or an emulsion thereof and an aggregate, usually a hard inert material of mineral composition such as sand, gravel, slag or crushed stone, to form a composite material which is widely used to surface roads, highways, airport run-ways, parking lots, and many other types of pavements. During the production of asphalt, the constituents of the mixture are combined in an asphalt preparation facility where they are proportioned, heated and mixed to produce asphalt. The asphalt is then stored mostly at the asphalt preparation facility from whence it is transported to a construction or maintenance site.

Conventional asphalt preparation facilities are mainly comprised of an assembly of various complex and large mechanical and electronic equipment. Accordingly, asphalt preparation facilities utilising the aforementioned equipment, although having a high production capacity, come with the disadvantage that they are stationary in that they are permanently situated at a location. The complexity in the setup of its infrastructure further comes with the disadvantage in that it requires a large area for the casting of a concrete foundation which allows for the equipment to be fixed onto. This means that frequent relocation of the facility to a site of construction or maintenance is neither ideal nor feasible when taking into consideration the challenges associated with assembling and disassembling of the entire facility as well as the logistics in transporting large equipment from one location to another location.

It is therefore common to haul asphalt from the preparation facility to the construction or maintenance site using dump trucks. However, the distance for which asphalt can be transported is limited due to the temperature drop experienced by the asphalt during transit. Should the asphalt temperature be allowed to decrease materially, it may no longer be possible to discharge it from the dump truck, or at least there is a change in achievable on-site compaction properties, which ultimately impacts on the performance of the surface which the asphalt is to form.

Accordingly, the use of asphalt produced at a stationary preparation facility present a problem in certain applications, such as road maintenance and pothole patching work where, by example, small amounts of asphalt, travel to remote locations and/or transporting in cold climates is required. Ideally, asphalt should be produced, laid and then immediately compacted before the temperature is allowed to drop below an optimal temperature zone.

A need therefore exists for a portable asphalt preparation apparatus, enabling onsite preparation of warm asphalt which allows for spreading and compaction to yield a surface with application-suitable properties, and thereby solve such disadvantages and problems and, by extension, facilitates quick surface repair that is inexpensive.

Further to the above, and due to the aforementioned applications for asphalt, careful selection of the process and raw materials used in the production of asphalt is of fundamental importance so as to avoid or limit failures in use, including the onset of pavement distresses of various types, bleeding or flushing, deflection, distortion and erosion.

As such, the process of producing asphalt includes a thorough mixing of the asphaltic binder or emulsion thereof with the mineral aggregate to ensure an asphalt product as a uniform dense mass. The uniformity of the asphalt is important as it allows for establishing consistent mixture properties, including density, viscosity and workability, during subsequent spreading and compaction to form a surface.

To ensure sufficient mixing between the asphaltic binder or emulsion thereof and the mineral aggregate, mixing is frequently at temperatures between 140° C. and 180° C. (referred to as "hot mixing") to ensure a sustainable bond between the mineral aggregate and the binder as a viscous fluid. Hot mixing is performed as lowering the mixing temperature below 140° C. is at present understood to result in a lowering of the viscosity of the binder, which in turn can lead to insufficient mixing, translating into issues during spreading and compaction.

To allow for a lowering of the mixing temperature whilst maintaining sufficient mixing, asphaltic binder emulsions, such as those including water, waxes or fatty amines, are rather used such that a higher viscosity of the binder is maintained at a lower temperature (referred to as "warm mixing").

The problem in the above-described hot and warm mixing in the known processes for producing asphalt is that they are heavily reliant on non-renewable raw materials. Furthermore, a known problem specific to hot mixing arises from a proven correlation between an increase in emissions or fumes, a source of air pollution as well as a health hazard, and an increase in temperature during mixing.

OBJECT OF THE INVENTION

It is accordingly an object of the invention to provide a portable warm asphalt preparation apparatus and a process for the production of warm asphalt that will, at least partially, alleviate the abovementioned problems and disadvantages and/or that will be a useful alternative to existing asphalt preparation facilities and/or processes for the production of asphalt.

SUMMARY OF THE INVENTION

According to a first aspect of the invention there is provided a portable warm asphalt preparation apparatus comprising:

a first receptacle defining a chamber, the chamber comprising:
    an inlet for introducing an asphalt feed material into the chamber,
    a floor at an inclined plane between a lower first end and an elevated second end, and
    an outlet disposed at the elevated second end for discharging a warm heterogeneous mixture from the chamber;
a conveying means provided between the first end and the second end of the floor of the chamber, the conveying means for mixing the asphalt feed material and transporting the resultant warm heterogeneous mixture along the inclined plane towards the outlet; and
a heating means for supplying heat to the asphalt feed material during mixing by the conveying means to enable formation of the warm heterogeneous mixture.

Warm is to be understood as a temperature between 70° C. and 150° C., preferably between 90° C. and 130° C., most preferably between 100° C. and 120° C., both values inclusive.

It is to be appreciated that asphalt feed material in the current context comprises a source of granular plastic and a source of mineral aggregate. The asphalt feed material may further comprise a binder material, such as bitumen or an emulsion thereof, such as an emulsion of bitumen and a wax additive. It is further to be appreciated that the constituents of the asphalt feed material may be introduced simultaneously or separately into the chamber. Where the asphalt feed material comprises a source of granular plastic, a source of mineral aggregate and a binder material, the warm heterogeneous mixture is a warm asphalt. Where the asphalt feed material comprises a source of granular plastic and a source of mineral aggregate alone, the warm heterogeneous mixture is a heterogeneous asphalt feed material mixture.

The first receptacle may include a cover for the inlet. The inlet cover may be mounted to a side of the first receptacle for slidably opening and closing the inlet. The inlet may be provided at a top of the chamber. The inlet cover may be mounted to the first receptacle approximate the top of the chamber. The inlet may be disposed at the top of the chamber at least partially above the first end of the first mixing chamber floor.

The first receptacle may further include a cover for the outlet. The outlet cover may be hingedly mounted to the first receptacle, enabling the outlet cover to be swingably moved to permit opening and closing of the outlet, such as during mixing and heating of the asphalt feed material in the chamber.

The first receptacle may still further include an inlet chute that is in material flow communication with the inlet and, in use, for guiding the asphalt feed material introduced at the inlet towards the conveying means.

The apparatus may comprise a discharge chute having an upper end disposed at the outlet and sloping outwards to a lower end, the discharge chute, in use, for conveying the warm heterogeneous mixture from the outlet to a target point at which the lower end is positioned.

The first mixing chamber may comprise a tapered section between the top of the chamber and the floor of the chamber such that the width of the floor is less than the width of the top. The floor may have a convex cross-sectional profile.

The inclined plane of the floor may be inclined at between 10° and 50° relative to a base of the first receptacle, preferably between 20° and 40°, most preferably 30°.

The conveying means may be a screw. The conveying means may be a shaftless spiral conveyor. The conveying means may comprise surface protuberances, such as spikes. The conveying means may be positioned above the floor, the lengthwise axis of the conveying means being at a plane corresponding with the inclined plane of the floor. The conveying means may extend from the first end to the second end of the floor.

The conveying means may be powered by a driving means. The driving means may comprise a crank coupled with gear reducers which, in turn, are directly connected to one end of the conveying means through a coupling, sprocket-and-chain or V-belt assembly. The driving means may be a motor. The motor may comprise a gearbox. The motor may allow rotational oscillation of the conveying means during mixing and heating of the asphalt feed material in the chamber.

The heating means may be a burner disposed below one or both of the first end and second end of the chamber floor, the burner thereby heating the chamber to a temperature between 70° C. and 150° C., preferably between 90° C. and 130° C., most preferably between 100° C. and 120° C., both values inclusive. The asphalt feed material in the chamber may thereby be heated indirectly by the burner through the floor while the asphalt feed material is mixed by the conveying means.

The apparatus may comprise a temperature sensor for measuring a temperature within the chamber. The temperature measured by the temperature sensor may be the temperature of the asphalt feed material in the chamber.

The apparatus may comprise a controller operatively connected to the heating means for activating and deactivating the heating means based on an input from the temperature sensor. Where the heating means is a burner, the controller may further cause actuation of a valve in a fuel line to the burner for interrupting and allowing a fuel supply to the burner when the burner is deactivated and activated respectively.

Where the asphalt feed material does not comprise a binder material, the apparatus may comprise a second receptacle for receiving the heterogeneous asphalt feed material mixture from the outlet. The second receptacle may then further receive the binder material from a binder tank, the binder tank may be attached to a side of the first receptacle at which the second receptacle is disposed. The second receptacle may comprise a mixing means for mixing the heterogeneous asphalt feed material mixture and the binder material to produce a warm asphalt. The mixing means may be a screw. The mixing means may be a shaftless spiral conveyor. The mixing means may be disposed between opposite ends of the second receptacle. The opposite ends of the second receptacle may be pivotably mounted on a support frame in a manner that permits pivoting of the second receptacle relative to the support frame about a lengthwise axis of the second receptacle, thereby permitting the warm asphalt to be poured out of the second receptacle.

Where the apparatus comprises a second receptacle, the first receptacle may yet further include a receiving tray for enabling the heterogeneous asphalt feed material mixture to flow from the outlet into the second receptacle. The receiving tray may have one end coupled to a region below the outlet of the chamber and an opposing free end extending outwardly therefrom. The receiving tray may be coupled to the first receptacle by adhesives, welding, fasteners or a combination thereof.

The support frame may be of any suitable construction. Preferably, the support frame may be constructed using plurality of metal bars welded together.

The binder tank may be heated by the transfer of heat between a shared side of the binder tank and the first receptacle.

The apparatus may be adapted to be mounted on a trailer for transportation to a site.

According to a second aspect of the invention there is provided a process for the production of warm asphalt, the process comprising the steps of:
- introducing a source of granular plastic and a source of mineral aggregate into a first receptacle chamber of an asphalt preparation apparatus, the chamber having a conveying means disposed therein and the asphalt preparation apparatus comprising a heating means for heating the chamber;
- mixing the source of granular plastic and a source of mineral aggregate in the chamber at a mixing temperature of between 70° C. and 150° C. to at least partially liquify the granular plastic and thereby forming a heterogeneous asphalt feed material mixture; and
- adding a binder material to the heterogeneous asphalt feed material mixture to form the warm asphalt.

It is to be appreciated that the steps of the process according to the second aspect of the invention need not necessarily be executed sequentially, as the process may be operated in a batch, semi-batch or continuous fashion. Furthermore, it is envisaged that the steps of the process provided for need not necessarily be executed in the order listed herein.

The asphalt preparation apparatus may comprise a second receptacle.

The step of adding the binder material may be preceded by a step of discharging the heterogeneous asphalt feed material mixture from the first receptacle chamber into the second receptacle, the binder material added to the second receptacle. The step of adding the binder material to the heterogeneous asphalt feed material mixture in the second receptacle may be followed by a step of mixing the binder material and the heterogeneous asphalt feed material mixture to form the warm asphalt in the second receptacle.

The step of adding the binder material may comprise adding the binder material to the heterogeneous asphalt feed material mixture in the first receptacle chamber.

The binder material may be any known binder material used in the production of asphalt, preferably bitumen, non-limiting examples of which are penetration grade 50/70 bitumen and MC30 cutback bitumen.

The binder material may further be an emulsion of bitumen and a wax additive. The wax additive may be SASOBIT.

Plastic in the current context is to be understood as any synthetic polymer or natural polymer or a combination thereof. Synthetic polymers include any plastics commonly used in consumer products, non-limiting examples of which are polyethylene (PE), polyethylene terephthalate (PET), polypropylene (PP), polyvinyl chloride (PVC), and polystyrene (PS). Natural polymers include, but is not limited to, rubber.

The source of granular plastic may be a source of recycled granular plastic. The source of recycled granular plastic may comprise a granule, flake, pellet or nurdle of any known shape or having an irregular shape. The pellet or nurdle may be a plastic wash plant product.

The source of granular plastic may comprise particles having a nominal maximum size of 10 mm, preferably 5 mm.

The source of mineral aggregate may be selected from the group consisting of: sand, gravel, slag, stone, crushed stone, a comminution product, reclaimed asphalt pavement (RAP) and any combination thereof.

The nominal maximum size of the mineral aggregate may be 32 mm, preferably 24 mm.

The mixing temperature may be between 70° C. and 150° C., preferably between 100° C. and 120° C., both values inclusive.

The heterogeneous asphalt feed material mixture may comprise up to 25 wt % granular plastic, preferably 15%, most preferably 13%. The heterogeneous asphalt feed material mixture may comprise up to 60 wt % RAP, preferably 40 wt %, most preferably from 25 wt % to 35 wt %.

The step of adding the binder material may comprise adding the binder material such that the formed warm asphalt comprises up to 10 wt % binder material, preferably 9 wt %. The warm asphalt may comprise up to 1 wt % wax additive.

BRIEF DESCRIPTION OF THE ACCOMPANYING DIAGRAMS

The invention will now further be described, by way of example only, with reference to the accompanying diagrams wherein.

DETAILED DESCRIPTION OF THE INVENTION

The invention described herein is not to be limited in scope by the specific embodiments herein disclosed, as the embodiments are intended as illustrative of several aspects of the invention. Any equivalent examples or embodiments are intended to be within the scope of this invention, as they will become apparent to those skilled in the art from the present description.

Figure 11:
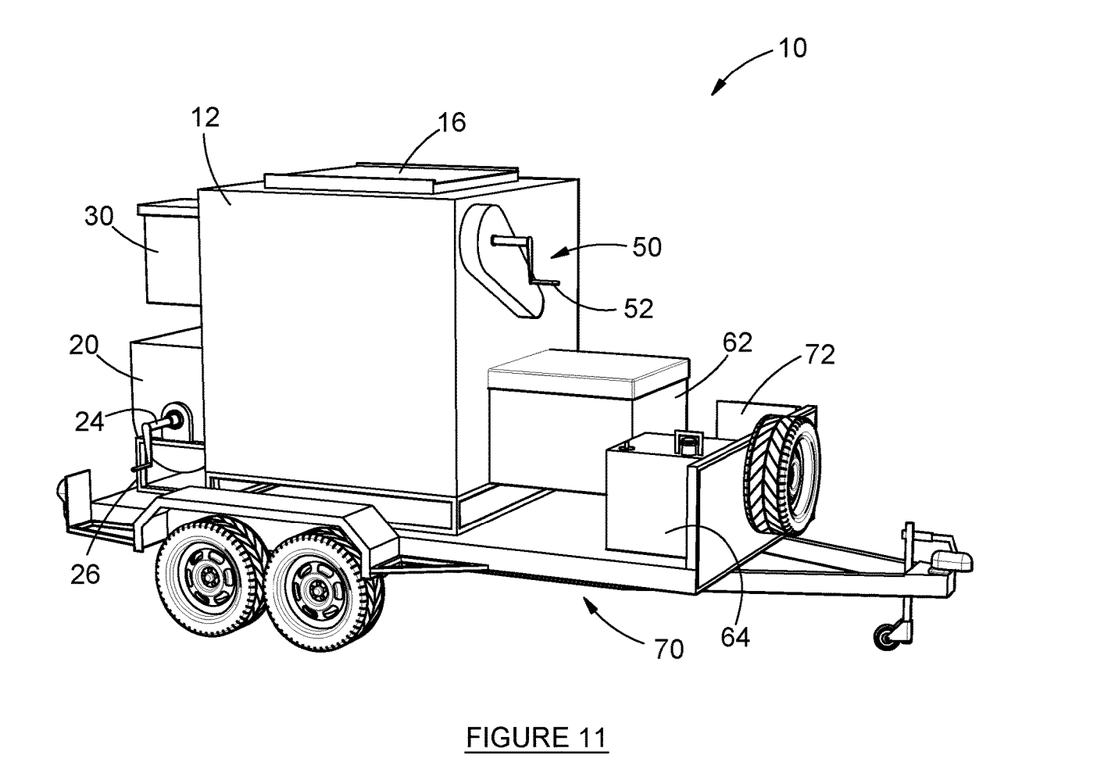
FIG. 11 is a perspective view of the portable warm asphalt preparation apparatus of FIG. 5, mounted on a trailer.
Figure 12:
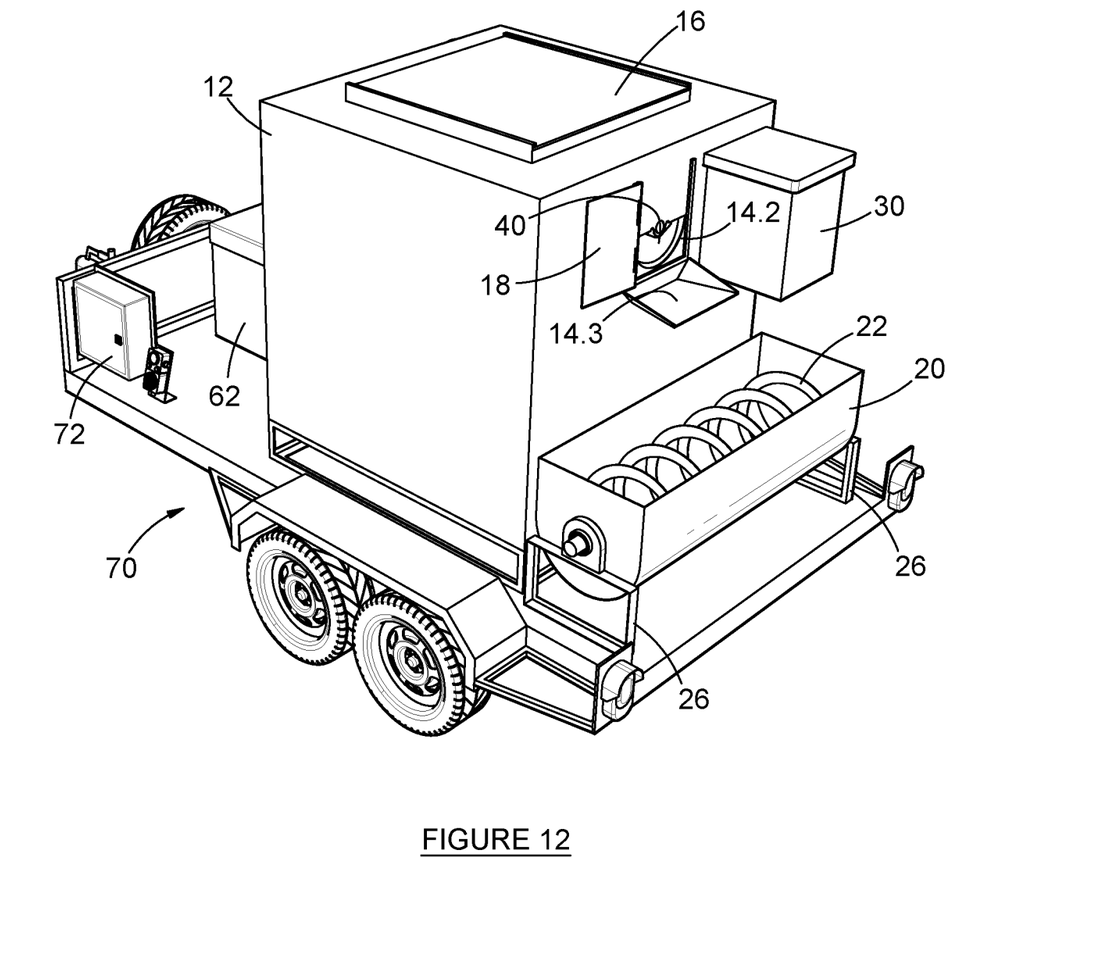
FIG. 12 is a further perspective view of the portable warm asphalt preparation apparatus of FIG. 5, mounted on a trailer.
Figure 13:
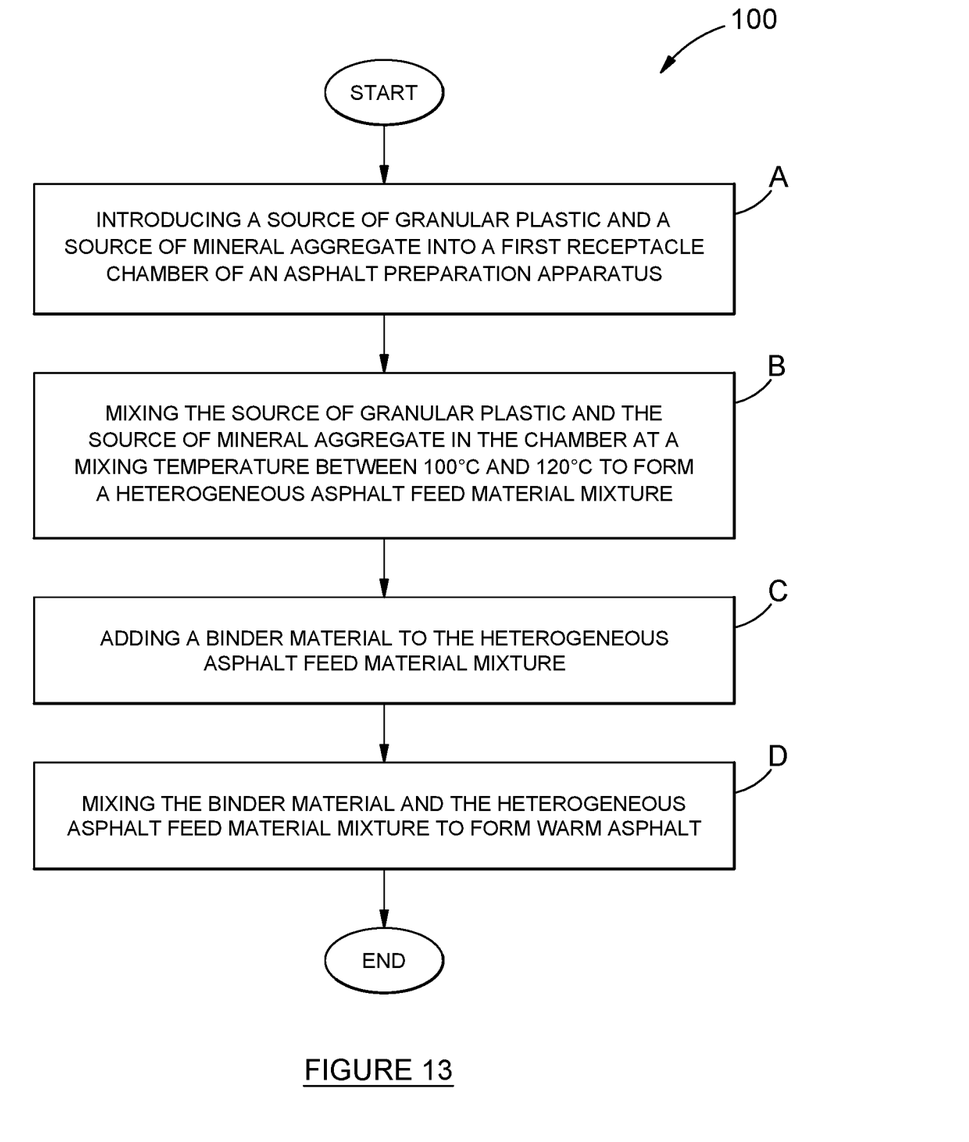
FIG. 13 is a flow diagram of a process for the production of warm asphalt according to a second aspect of the invention.

With reference to FIGS. 1 to 12, a portable warm asphalt preparation apparatus according to the invention is generally indicated by reference numeral 10 and with reference to FIG. 13, a process for the production of warm asphalt is generally indicated by reference numeral 100.

FIGS. 1 through 4, 9 and 10 show a first example embodiment of the apparatus 10 according to the invention and FIG. 13 shows a flow diagram of the process 100 for the production of warm asphalt as enabled by the apparatus 10. The apparatus 10 is shown to comprise a first receptacle 12 defining a chamber 14. This chamber 14 includes an inlet 14.1 provided at a top of the chamber 14 for introducing A an asphalt feed material comprising a source of granular plastic into the chamber 14 and an outlet 14.2 for discharging a warm heterogeneous mixture from the chamber 14 unto a discharge chute 28. Accordingly, the discharge chute 28 has an upper end disposed at the outlet 14.2 and sloping outwards to a lower end, in use, allowing the discharge chute 28 to convey the warm heterogeneous mixture from the outlet 14.2 to any target point at which the lower end is positioned.

Figure 1:
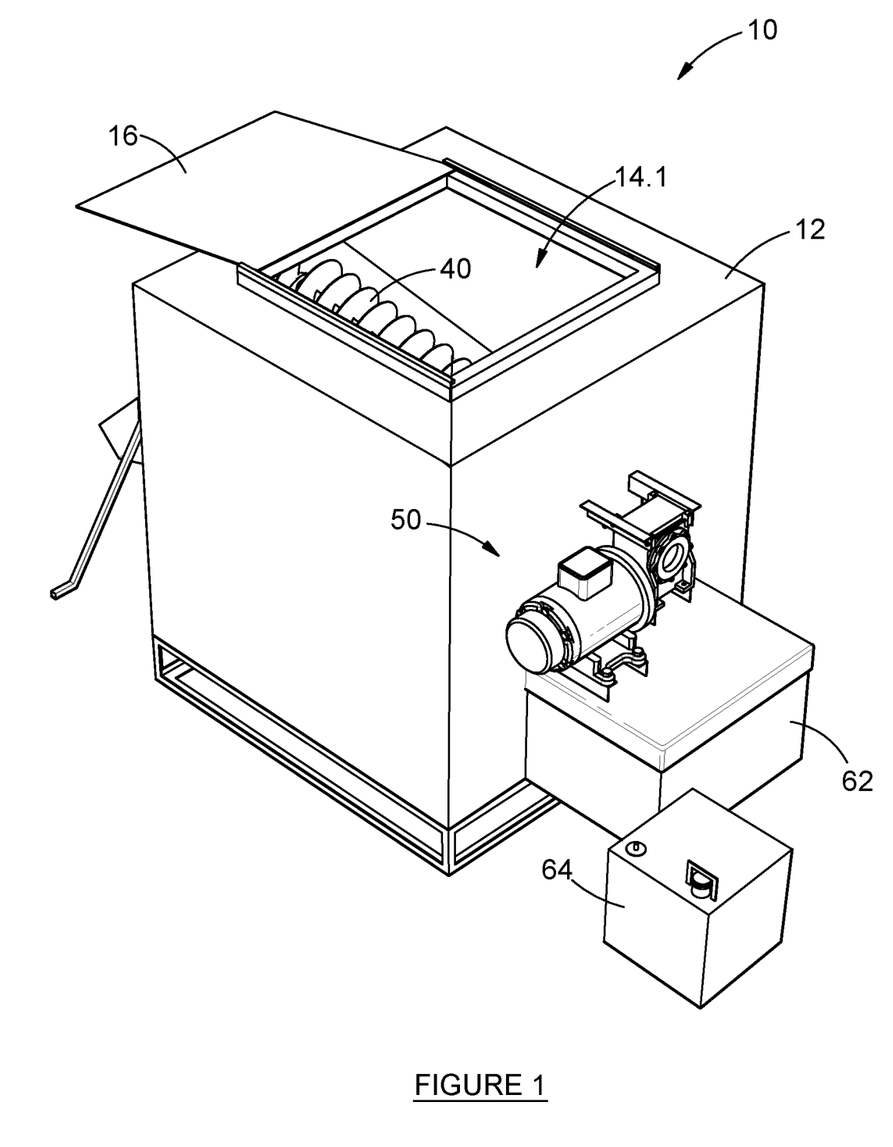
FIG. 1 is a perspective view of a portable warm asphalt preparation apparatus according to a first example embodiment of a first aspect of the invention.
Figure 2:
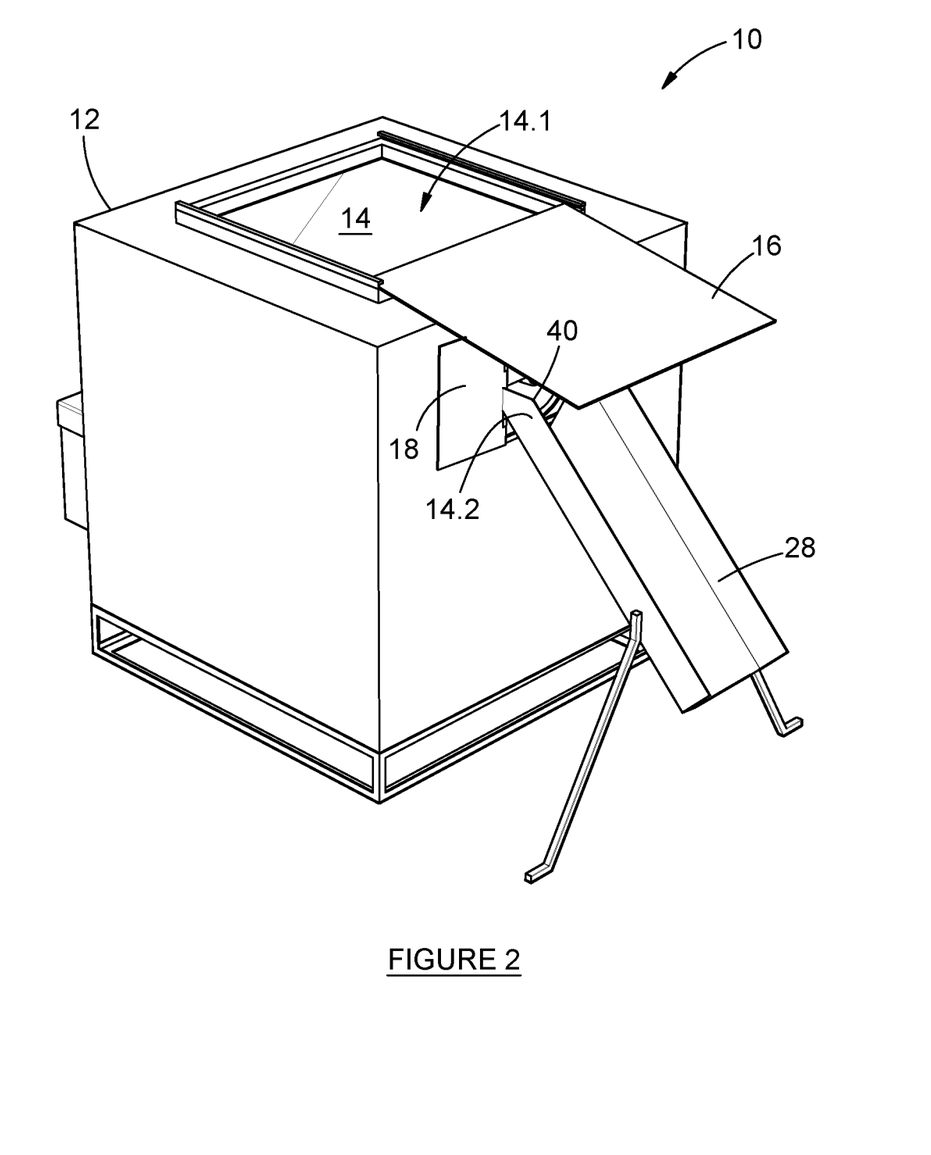
FIG. 2 is a further perspective view of the portable warm asphalt preparation apparatus of FIG. 1.

The first receptacle 12 is further shown to include an inlet cover 16 mounted on top of the first receptacle 12 for slidably opening and closing the inlet 14.1. The first receptacle 12 is still further shown to include an outlet cover 18. The outlet cover 18 can, by example, be hingedly mounted to a side of the first receptacle 12 at which the outlet 14.2 is disposed by means of a hinge structure of the known kind for enabling the outlet cover 18 to swingably open and close the outlet 14.2, or by way of further example, can open and close by means of counter lever operation (not shown) which allows slidable opening and closing of the outlet cover 18.

Figure 3:
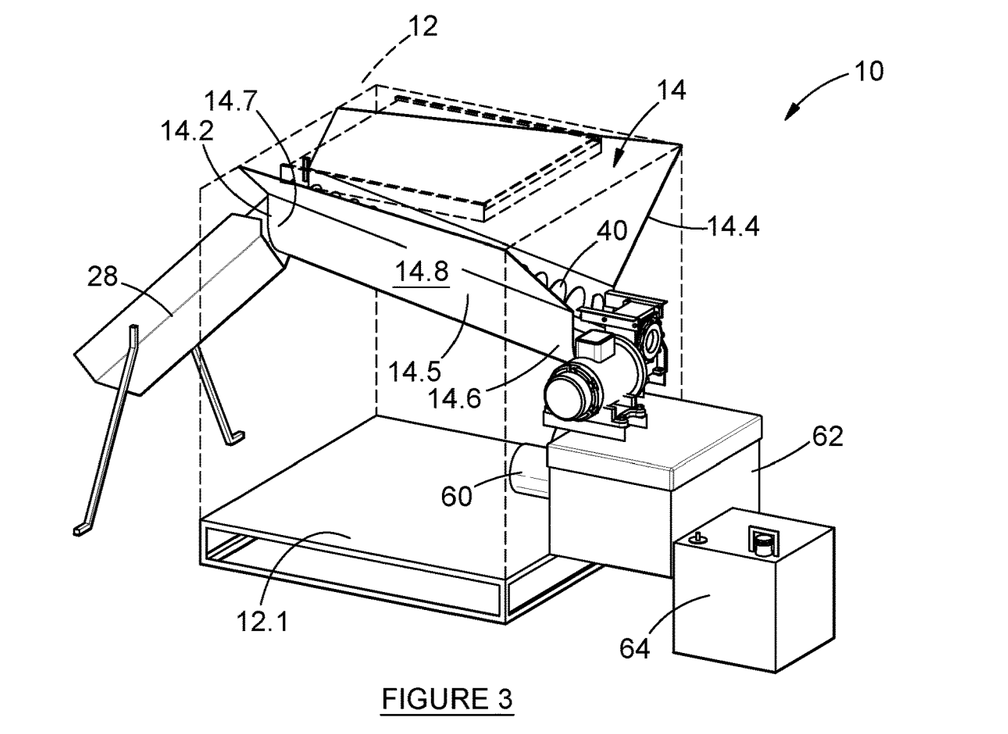
FIG. 3 is a partially transparent perspective view of the portable warm asphalt preparation apparatus of FIG. 1.
Figure 4:
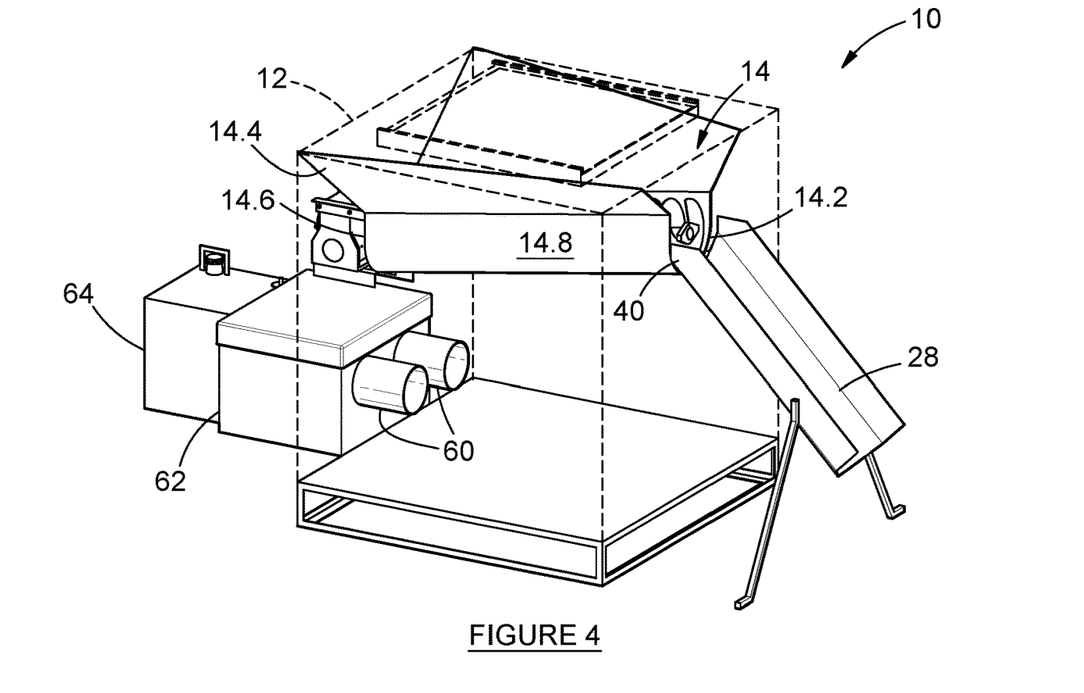
FIG. 4 is a further partially transparent perspective view of the portable warm asphalt preparation apparatus of FIG. 1.
Figure 9:
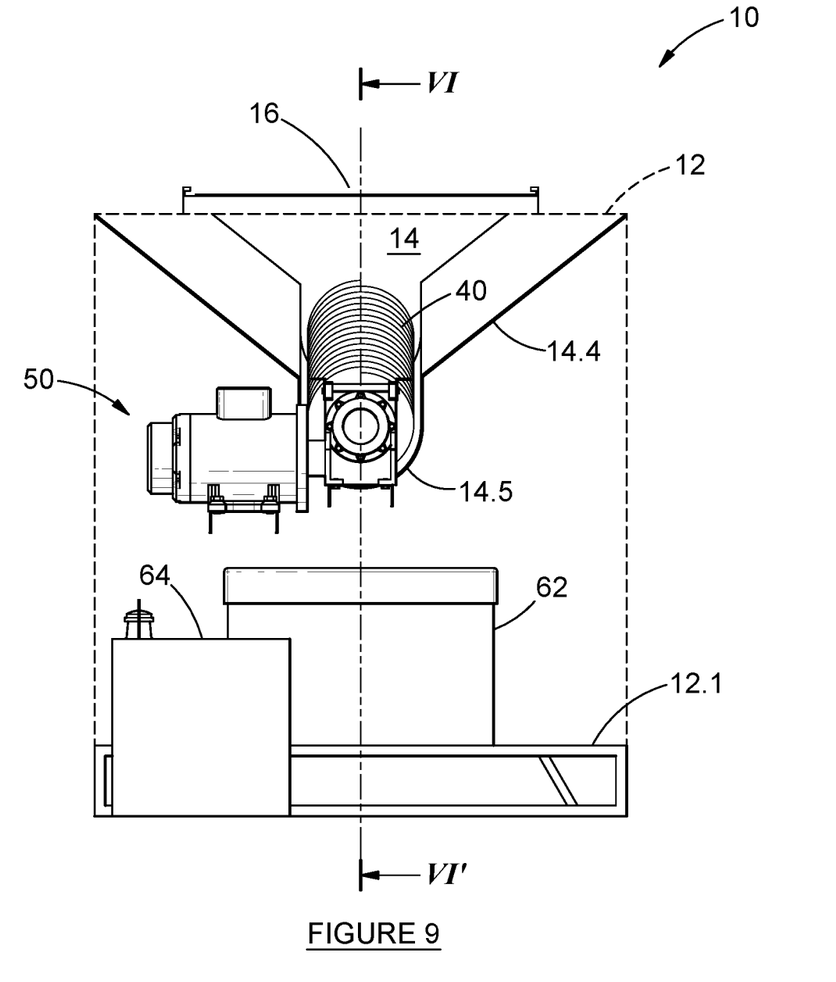
FIG. 9 is a side view of the portable warm asphalt preparation apparatus of FIG. 1.

FIGS. 3 and 4 show partially transparent perspective views of the apparatus 10 of FIGS. 1 and 2. Herein, the chamber 14 is shown to comprise a tapered section 14.4 between the top of the chamber 14 and a floor 14.5 of the chamber 14 such that the width of the floor 14.5 is less than the width of the top. The chamber floor 14.5 is shown in FIG. 9 as having a convex cross-sectional profile, the chamber floor 14.5 further provided at an inclined plane between a lower first end 14.6 and an elevated second end 14.7 such that any asphalt feed material contained in the chamber 14 would tend to gravitate towards the first end 14.6. In the present embodiment, the angle of incline of the inclined plane of the chamber floor 14.5 is 30° relative to a base 12.1 of the first receptacle 12 but, as it will become apparent from the present description, this angle of incline can be any degree required to allow sufficient gravitation of asphalt feed material contained in the chamber 14 to the first end 14.6. It can be seen that the tapered section 14.4 does not extend completely from the top of the chamber 14 to the floor 14.5, but rather extends partially between the top of the chamber 14 and the floor 14.5, terminating at a non-tapered section which, together with the convex cross-sectional profile of the chamber floor 14.5, forms a channel 14.8 in which a conveying means 40 is disposed above the floor 14.5.

The apparatus 10 is shown to comprise the conveying means as a screw 40 (shown in FIG. 10) which acts to both mix B the asphalt feed material contained in the chamber 14, advanced by the gravitation of the asphalt feed material to the first end 14.6 by virtue of the inclined plane of the floor 14.5, and transporting the resultant warm heterogeneous mixture along the inclined plane of the chamber floor 14.5 to the outlet 14.2. This screw 40 extends from the first end 14.6 to the second end 14.7, FIG. 9 showing the lengthwise axis of the screw 40 at a plane corresponding with the inclined plane of the chamber floor 14.5.

In this example embodiment, the apparatus 10 comprises a driving means as a motor 50, such as an electric motor and gearbox, for driving rotation of the screw 40. It is to be appreciated that, in order to further advance mixing B of the asphalt feed material in the chamber 14, the motor 50 and gearbox can be configured to allow for rotational oscillation of the screw 40 (i.e., allow the screw 40 to rotate both clockwise and anticlockwise).

Figure 10:
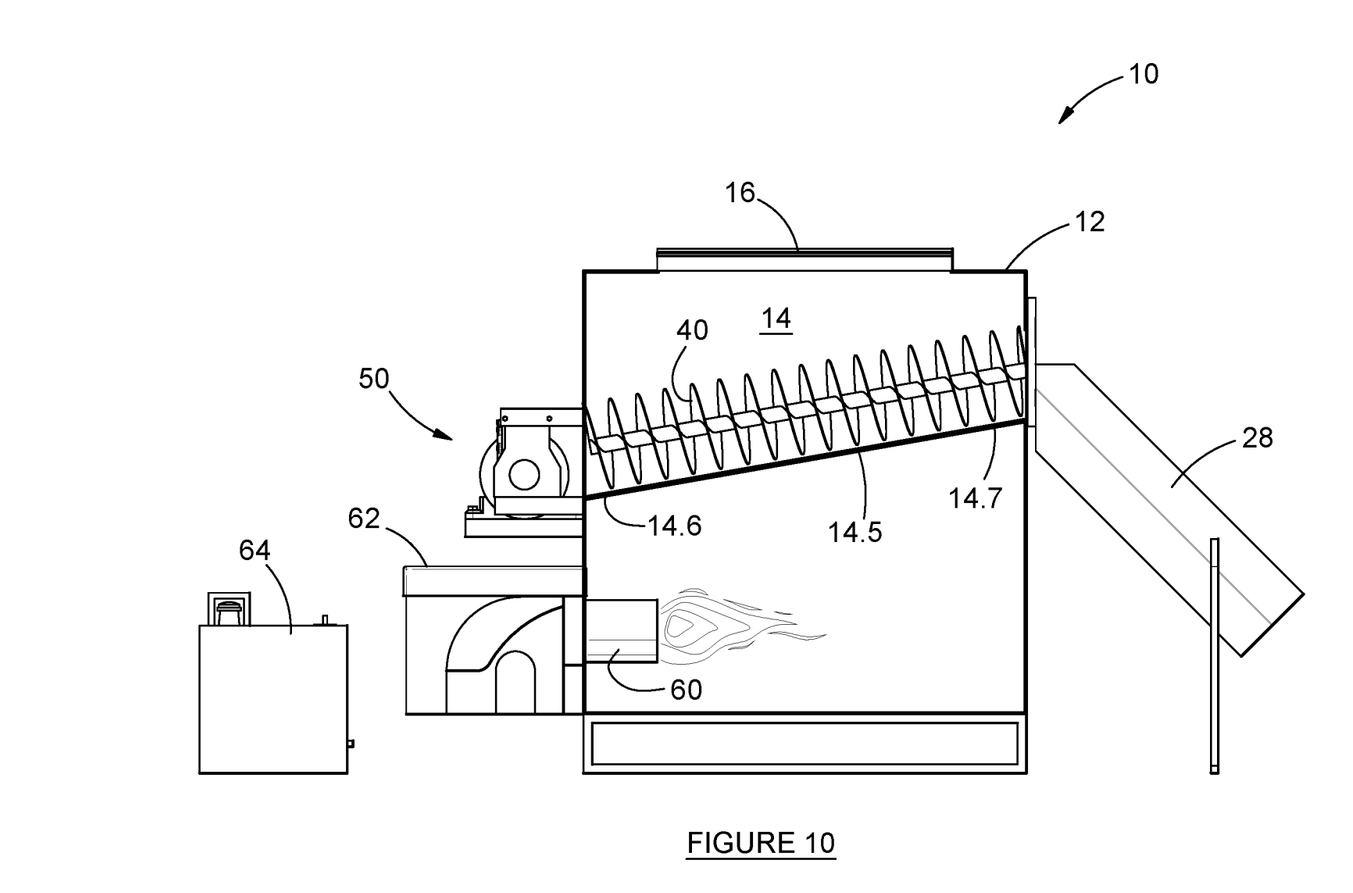
FIG. 10 is a cross-sectional side view of the portable warm asphalt preparation apparatus along the line VI to VI' shown in FIG. 9.

FIG. 10 shows a cross-sectional view of the apparatus 10 along the line VI to VI' provided in FIG. 9. The apparatus 10 is shown to comprise a heating means as a burner 60 for indirectly supplying heat to asphalt feed material contained in the chamber 14 during mixing B by the screw 40, thereby enabling the production of the warm heterogeneous mixture. The burner 60 is disposed in a housing 62 adjacently coupled to the first receptacle 12 and a portion of which extends therethrough into a region of the first receptacle 12 at the first end 14.6 of the chamber 14 below the floor 14.5. The power source of the burner 60 is shown as an electric battery 64, this battery 64 allowing the burner 60 to ignite a fuel supply and thereby operate as a burner. The burner 60 is used to heat the chamber 14, and therefore the contents of same, to a mixing temperature of between 100° C. and 120° C.

In the above exemplified embodiment, the asphalt feed material comprises the source of granular plastic, a source of mineral aggregate and a binder material as an emulsion of bitumen, such as penetration grade 50/70 bitumen, and a wax additive, such as SASOBIT. The source of granular plastic can be, by example, a 5 mm pellet product from a plastic wash plant.

It is to be appreciated that such 5 mm pellets can contain one or a plurality of plastic constituents, such as synthetic plastics commonly occurring in consumer products or natural plastics such as rubber. By example, the pellets may contain polyethylene (PE), polyethylene terephthalate (PET), polypropylene (PP), polyvinyl chloride (PVC), polystyrene (PS) or a combination thereof. As such, the melting point of the pellet may not be uniform, and can range from 105° C. to 115° C. (such as for low density PE) to 240° C. (such as for PS).

The source of mineral aggregate comprises sand, crusher dust as a comminution product, gravel and/or stone and reclaimed asphalt pavement (RAP), such that the composition of the combination of the source of granular plastic and the source of mineral aggregate is:

| Constituents | Wt % |
| --- | --- |
| Sand | 10 |
| 5 mm Plastic Pellets | 13 |
| Crusher Dust | 22 |
| Gravel/Stone | 30 |
| RAP | 25 |

The source of granular plastic and the source of mineral aggregate is then mixed B in the chamber 12 at the mixing temperature of between 100° C. and 120° C. to form a heterogeneous asphalt feed material mixture.

It is to be appreciated that the outlet 14.2 of the chamber 14 is closed during this mixing B so as to avoid discharge of the contents of the chamber 14 during mixing B and thereby enable the process 100 to be operated in a batch fashion. However, an adjustment of the angle of incline of the floor 14.5 of the chamber 14 and/or rotational oscillation of the screw 40 would enable the process 100 to be operated in a continuous or semi-batch fashion as well, thereby allowing the outlet 14.2 to be open during mixing B.

As noted, the mixing temperature is achieved through the burner 60 positioned beneath the chamber 14 floor 14.5 which acts to heat the chamber 14, thereby indirectly the asphalt feed material therein. Heating the plastic pellets and the mineral aggregate in this manner allows the at least partial liquefaction of the plastic pellets during mixing B and allows for the formation of the heterogeneous asphalt feed material mixture by means of the screw 40.

Partial liquefaction of the plastic pellets may result from differential melting points of constituents of a pellet, and the degree of such liquefaction would be a function of the corresponding melting points of the constituents of the pellets, the mixing temperature and the residence time of the plastic pellets in the chamber 14 during mixing B. Accordingly, in the event of only partial liquefaction, the heterogeneous asphalt feed material mixture would comprise, as solid phase, the mineral aggregate and any residual unmelted plastic pellets and, as liquid phase, the portion of melted plastic.

After formation of the heterogeneous asphalt feed material mixture, the binder material is added C to the chamber 14, and the heterogeneous asphalt feed material mixture and binder material is then mixed D to form a warm heterogeneous mixture as warm asphalt. Importantly, during this mixing D, the liquid phase of the heterogeneous asphalt feed material mixture acts to facilitate the formation of a sustainable bond between solids of the heterogeneous asphalt feed material mixture and the binder material.

In order to allow for control of the mixing temperature to achieve a desired heterogeneous asphalt feed material mixture and subsequent warm asphalt upon addition C and mixing D of the binder material, the apparatus 10 further comprises a temperature sensor of a known kind (not shown) for measuring a temperature within the chamber 14 and thereby the temperature of the asphalt feed material in the chamber 14. The apparatus 10 then further comprises a controller 72 (shown in FIGS. 11 and 12) operatively connected to the burner 60 and for activating and deactivating the burner 60 based on an input from the temperature sensor. By example, if the temperature sensor measures a temperature greater than 120°, an input is provided to the controller 72 which causes the controller 72 to deactivate (switch off) the burner 60 and conversely, if the temperature sensor measures a temperature less than 100°, an input is provided to the controller 72 which causes the controller 72 to activate (switch on) the burner 60. In order to avoid wastage of a fuel supply to the burner 60, a fuel line (not shown) to the burner 60 is provided with a valve (not shown). The controller 72 is then further operatively connected to the valve so that it can be caused to actuate the valve such that the fuel supply to the burner 60 is interrupted and allowed when the burner 60 is deactivated and activated respectively.

The apparatus 10 of the first example embodiment is adapted for preparing batches of 0.5 tons of warm asphalt in a period of 30 minutes (or longer as may be required to produce warm asphalt of a uniform nature and at, by example 120° C.), during which oscillating rotation of the screw 40 in conjunction with gravitational force act to mix the asphalt feed material. After a uniform warm asphalt at, by example, 120° C. is established, the outlet cover 18 is swingably moved to an open position so as to permit discharge of the warm asphalt from the chamber 14 through the outlet 14.2 unto the discharge chute 28 by means of then unidirectional rotation of the screw 40.

During a 30-minute batch, the binder material is added C to the heterogeneous asphalt feed material mixture such that the warm asphalt comprises 9 wt % bitumen and approximately 1 wt % wax additive, the balance comprising the constituents from the heterogeneous asphalt feed material mixture, thereby allowing the production of a warm asphalt comprising more than 10 wt % recycled plastic and more than 20 wt % RAP.

Importantly, this warm asphalt is suitable for use in low density traffic applications and gravel road surfacing (and even high density traffic applications where the appropriate binder material is used and/or with rubber as recycled tyres forming part or the whole of the source of granular plastic), as testing of specimens prepared from the warm asphalt in accordance with the standard Marshall Mix Design Method and SANS 3001-AS10 test procedure, using 75 hits on each side of the specimen at a compaction temperature of approximately 120° C. yields the following properties and characteristics:

- a void in mix (VIM) of between 5 to 15% which allows a compacted product of the warm asphalt, in use, to act as a semi water-permeable solid, mitigating erosion of the pavement structure especially in high moisture regions;
- a stability of between 200 kN to 500 kN;
- a flow of between 7 to 15 (0.25 mm);
- an average bulk relative density (BRD) of between 1.600 and 2.500; and
- an indirect tensile strength (ITS) of between 0.5 to 2.5 MPa as established in accordance with the TMH1 method C12T.

As noted, any binder material which is suitable for use in pavement construction may be used, such as any heated asphaltic binder. Furthermore, the wax additive is provided to improve the workability and viscosity of the binder, but the need for such an additive is dependent on the type of asphaltic binder used.

FIGS. 5 through 8 show a second example embodiment of the apparatus 10. In this example embodiment, a source of granular plastic and a source of mineral aggregate are introduced A into the chamber 14 as asphalt feed material. Therefore, the apparatus 10 is shown to include a second receptacle 20 for receiving a warm heterogeneous mixture as the heterogeneous asphalt feed material mixture discharged from the outlet 14.2 of the first receptacle 12 chamber 14. The second receptacle 20 then further receives the binder material from a binder tank 30. The second receptacle 20 in this example embodiment comprises a shaftless spiral screw 22 as a mixing means for mixing the heterogeneous asphalt feed material mixture and the binder material in the second receptacle 20 to produce a warm asphalt. The shaftless spiral screw 22 is operable using a crank 24 and is disposed between opposite ends of the second receptacle 20. The opposite ends of the second receptacle 20 are pivotably mounted on a support frame 26 in a manner that enables pivoting of the second receptacle 20 relative to the support frame 26 about a lengthwise axis of the second receptacle 20, thereby permitting the warm asphalt contained in the second receptacle to be poured out. In the present example embodiment, the support frame 26 is shown to be as simple as a construction comprising a plurality of metal bars welded together.

In order to allow for the heterogeneous asphalt feed material mixture to flow from the outlet 14.2 into the second receptacle 20, the first receptacle 12 is provided with a receiving tray 14.3 having one end coupled to a region below the outlet 14.2 of the first receptacle 12 chamber 14 and an opposing free end extending outwardly therefrom such that the heterogeneous asphalt feed material mixture is allowed to fall into the second receptacle 20.

Figure 5:
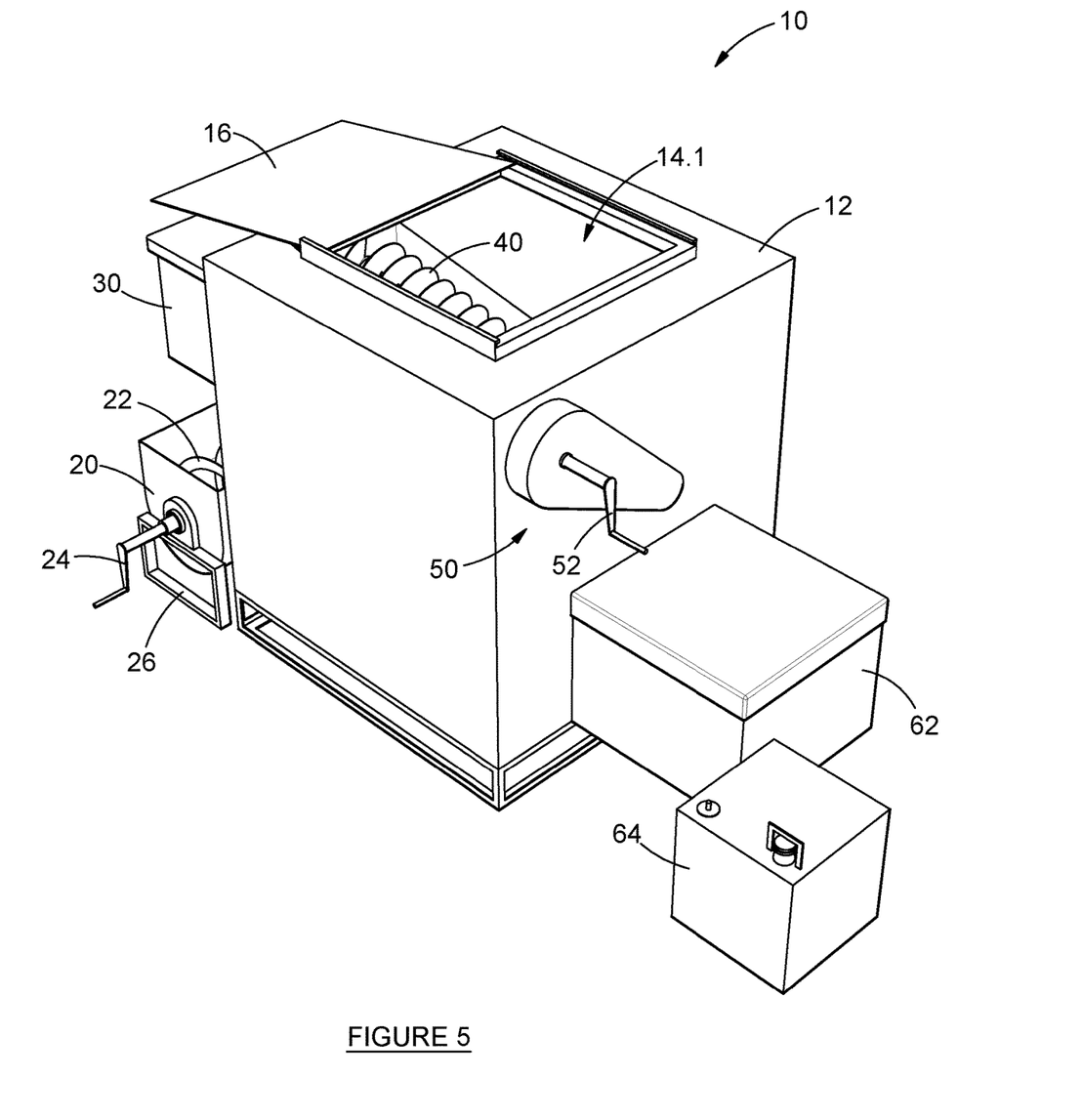
FIG. 5 is a perspective view of a portable warm asphalt preparation apparatus according to a second example embodiment of the first aspect of the invention.
Figure 6:
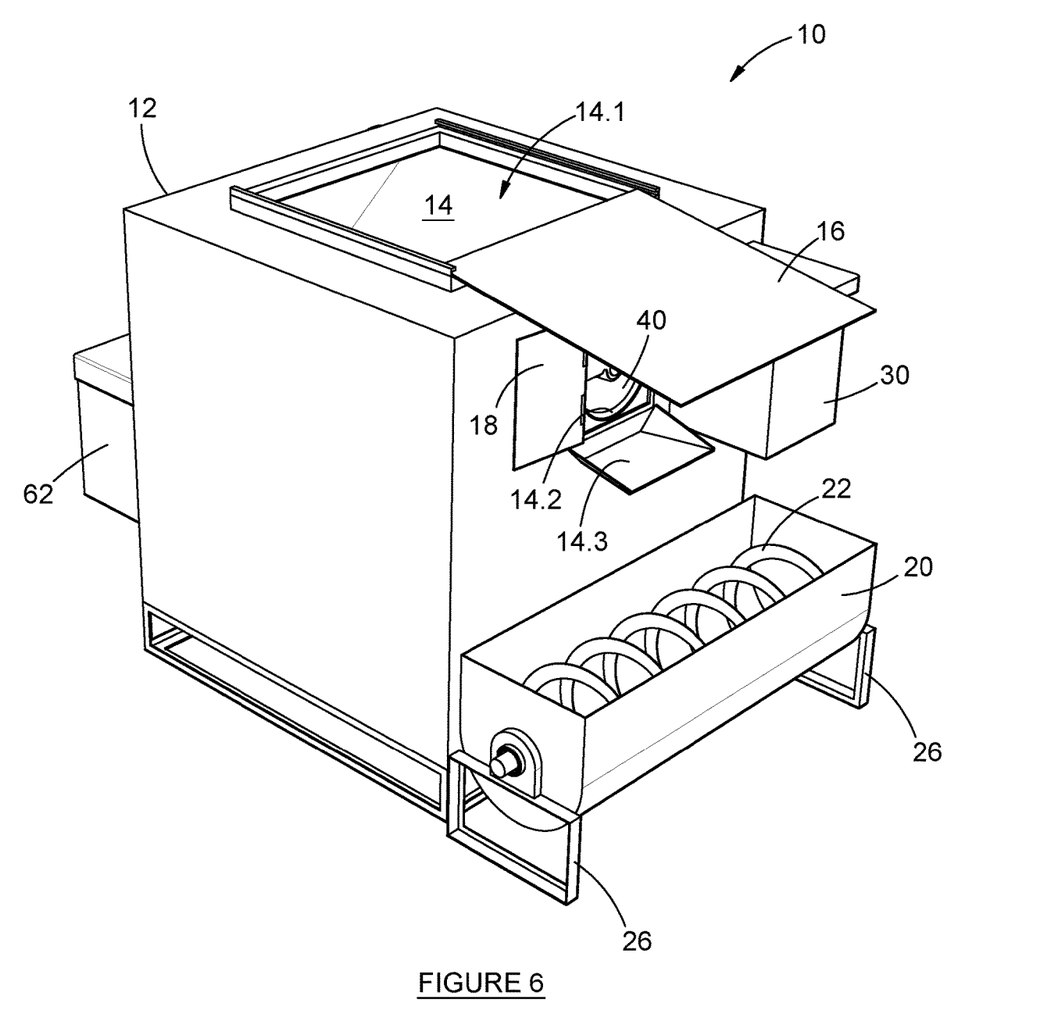
FIG. 6 is a further perspective view of the portable warm asphalt preparation apparatus of FIG. 5.
Figure 7:
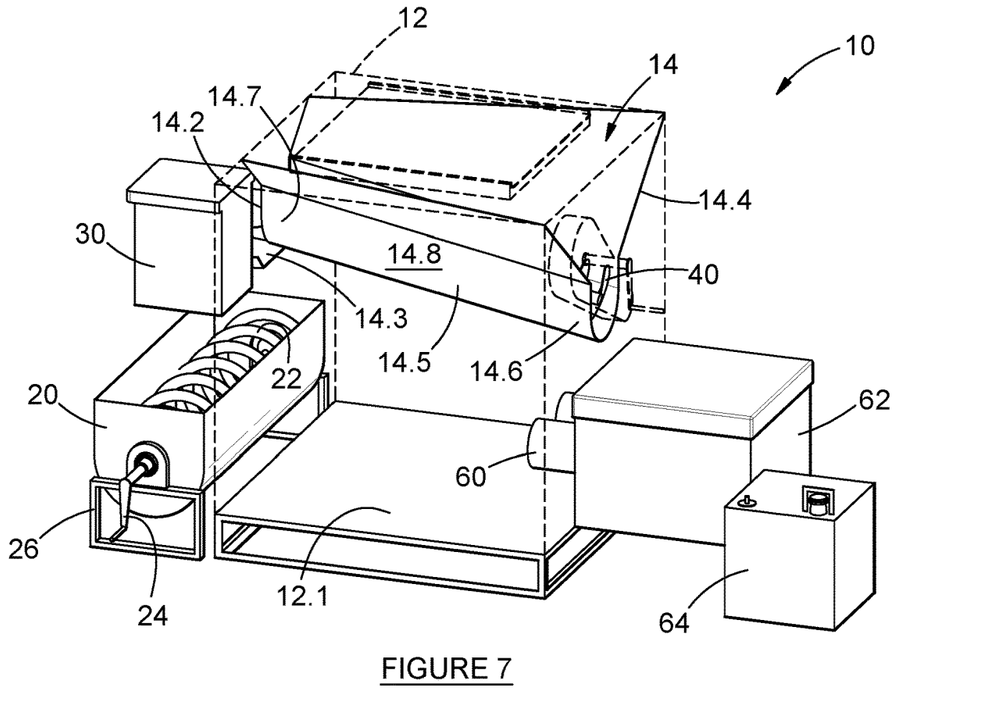
FIG. 7 is a partially transparent perspective view of the portable warm asphalt preparation apparatus of FIG. 5.
Figure 8:
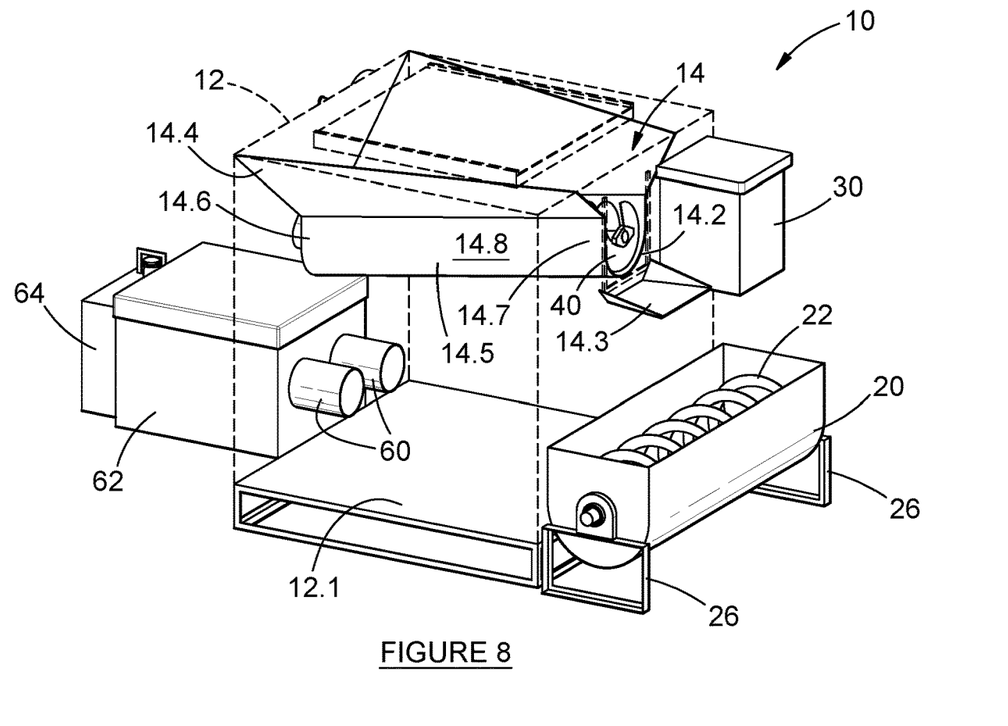
FIG. 8 is a further partially transparent perspective view of the portable warm asphalt preparation apparatus of FIG. 5.

Further to the above, FIG. 5 shows the driving means 50 to include a crank 52 coupled with gear reducers of the known kind (not shown) which, in turn, can be connected to one end of the screw 40 through a sprocket-and-chain (not shown) of the known kind, thereby allowing the entire apparatus 10 to be operated manually and alleviating the need for a driving means 50 power source, such as may be required for a site in a rural area.

Finally, FIGS. 11 and 12 show the example embodiment of the apparatus 10 of FIGS. 5 through 8 as mounted on a trailer 70 for transportation to any site, such as a site of road maintenance.

It was found that the simplicity of the apparatus 10, by only comprising as structural components the first receptacle 12 defining a chamber 14 and having a screw 40 and a burner 60 and optionally the second receptacle 20, allows for the apparatus 10 to be portable, such as by means of being mounted on a trailer 70, vehicle flatbed or the like. The portability of the apparatus 10 substantially overcomes the disadvantages of the known stationary facilities, while enabling a simple and inexpensive process 100 for the production of warm asphalt which is suitable for use in a wide range of applications by virtue of the warm asphalt's achievable properties and characteristics for purposes of spreading and compaction and thereafter, whilst also allowing for the use of renewable and/or waste asphalt feed materials which can to a large extent be sourced at the site to which the apparatus 10 is to be transported.

The simplicity of the apparatus's configuration therefore renders it not just easier and relatively inexpensive to operate and maintain as compared to that of the more complex and larger stationary asphalt preparation facilities, but as the apparatus 10 does not require the steps of assembling and disassembling each time it is to be relocated nor the casting of a concrete foundation during the setup operation, the apparatus 10 and the process 100 enabled thereby ultimately affords a user the flexibility to operate anywhere at or near a remote site in a manner that is both time- and cost-effective.

Simultaneously, the problem of a temperature drop that is experienced during the transport of asphalt produced at a stationary asphalt preparation facility to a site, particularly over long distances, is solved together with the issues of wastage that is experienced specifically during road maintenance and pothole patching work where only a small amount of the transported asphalt may in the end be used.

Consequently, the above apparatus 10 and process 100 allows for the production of a warm asphalt which not only utilises renewable and/or waste materials (through the use of recycled plastic, rubber, crusher dust and RAP), but allows doing so at temperatures not higher than 120° C., thereby avoiding excessive emission and/or fume generation during the process 100.

The invention claimed is:

1. A portable warm asphalt preparation apparatus comprising:
   a source of granular plastic;
   a source of mineral aggregate;
   the granular plastic and mineral aggregate from the sources forming an asphalt feed material;
   a first receptacle defining a chamber, the chamber comprising:
   an inlet for introducing the asphalt feed material into the chamber,
   a floor at an inclined plane between a lower first end of the chamber and an elevated second end of the chamber, and
   an outlet disposed at the elevated second end for discharging a warm heterogenous mixture formed of the granular plastic and mineral aggregate from the chamber;
   a conveying means provided between the lower first end and the elevated second end of the floor of the chamber, the conveying means for mixing the asphalt feed material and transporting a resultant warm heterogenous mixture along the inclined plane towards the outlet; and
   a heating means for supplying heat to the asphalt feed material during mixing by the conveying means to enable formation of the warm heterogenous mixture;
   wherein the heating means is a burner disposed below one or both of the first end and second end of the chamber floor, such that, when the asphalt feed material is in the chamber, it is heated indirectly by the burner through the floor while the asphalt feed material is mixed by the conveying means;
   wherein the burner heats the chamber to a temperature from 100° C. to 120° C.;
   wherein the apparatus comprises a temperature sensor for measuring a temperature within the chamber; and
   wherein the apparatus further comprises a controller operatively connected to the burner for activating and deactivating the burner based on an input from the temperature sensor, the controller further operatively acting to actuate a valve for interrupting and allowing a fuel supply to the burner when the burner is deactivated and activated, respectively, thereby maintaining the temperature in the chamber in a range of 100° C. to 120° C. to form the warm heterogenous mixture that is discharged from the outlet of the chamber without excessive emissions and/or fume generation from the chamber.

2. The portable warm asphalt preparation apparatus of claim 1, wherein the asphalt feed material further comprises a binder material, the warm heterogenous mixture discharged at the outlet being a warm asphalt.

3. The portable warm asphalt preparation apparatus of claim 1, wherein the inlet is provided at a top of the chamber at least partially above the lower first end of the chamber floor and an inlet cover being mounted to the first receptacle approximate the top of the chamber for opening and closing the inlet.

4. The portable warm asphalt preparation apparatus of claim 3, wherein the first receptacle includes an inlet chute in material flow communication with the inlet and, in use, for guiding the asphalt feed material introduced at the inlet towards the conveying means.

5. The portable warm asphalt preparation apparatus of claim 3, wherein the chamber comprises a tapered section between the top of the chamber and the floor of the chamber such that the width of the floor is less than the width of the top.

6. The portable warm asphalt preparation apparatus of claim 5, wherein the floor has a convex cross-sectional profile.

7. The portable warm asphalt preparation apparatus of claim 6, wherein the inclined plane of the floor is inclined at between 10° and 50° relative to a base of the first receptacle.

8. The portable warm asphalt preparation apparatus of claim 7, wherein the inclined plane of the floor is inclined at 30° relative to the base of the first receptacle.

9. The portable warm asphalt preparation apparatus of claim 8 wherein the conveying means is a screw positioned above the floor, a lengthwise axis of the screw at a plane corresponding with the inclined plane of the floor and extending from the lower first end to the elevated second end of the floor.

10. The portable warm asphalt preparation apparatus of claim 9, wherein the screw comprises a plurality of surface protuberances.

11. The portable warm asphalt preparation apparatus of claim 10, wherein the screw is powered by a motor, the motor allowing rotational oscillation of the screw during mixing of the asphalt feed material.

12. The portable warm asphalt preparation apparatus of claim 1 comprising a discharge chute having an upper end disposed at the outlet and sloping outwardly from the chamber to a lower end, the discharge chute, in use, for conveying the warm heterogenous mixture from the outlet to a target point at which the lower end is positioned.

13. The portable warm asphalt preparation apparatus of claim 1 comprising a second receptacle for:

receiving the warm heterogeneous mixture from the outlet of the chamber, and receiving the binder material from a binder tank attached to a side of the first receptacle; and the second receptacle comprising a mixing means for mixing the heterogeneous asphalt feed material mixture and the binder material in the second receptacle to produce a warm asphalt.

14. The portable warm asphalt preparation apparatus of claim 13, wherein the second receptacle is pivotably mounted on a support frame, in use, allowing the second receptacle to pivot relative to the support frame thereby permitting the warm asphalt to be poured out of the second receptacle.

15. The portable warm asphalt preparation apparatus of claim 14, wherein the first receptacle includes a receiving tray for enabling the heterogeneous asphalt feed material mixture to flow from the outlet into the second receptacle, one end of the receiving tray coupled to a region below the outlet and an opposing free end of the receiving tray extending outwardly from the first receptacle.

16. The portable warm asphalt preparation apparatus of claim 1 being adapted to be mounted on a trailer for transportation.

* * * * *